United States Patent [19]

Guarr

[11] Patent Number: 5,060,912
[45] Date of Patent: Oct. 29, 1991

[54] SPARE TIRE HOLDER AND WHEEL LOCK

[76] Inventor: David Guarr, P.O. Box 14532, Lenexa, Kans. 66215

[21] Appl. No.: 424,941

[22] Filed: Oct. 23, 1989

[51] Int. Cl.$^5$ .............................................. B66D 1/06.
[52] U.S. Cl. .................................... 254;323; 254/266
[58] Field of Search ...................... 254/323, 325, 266; 464/174

[56] References Cited

U.S. PATENT DOCUMENTS

| | | |
|---|---|---|
| 2,433,921 | 1/1948 | Nelson .................................. 254/323 |
| 2,661,130 | 12/1953 | Evans . |
| 3,390,864 | 7/1968 | Searcy et al. . |
| 3,399,584 | 9/1968 | Lewicki ............................. 464/174 |
| 3,431,756 | 3/1969 | Fennell . |
| 3,435,634 | 4/1969 | Chatham ............................ 464/174 |
| 3,539,152 | 11/1970 | Paul . |
| 3,542,413 | 11/1970 | Harison .............................. 254/325 |
| 3,865,264 | 2/1975 | Kuhns . |
| 4,241,595 | 12/1980 | Van Gompel . |
| 4,794,771 | 1/1989 | Princell . |
| 4,915,358 | 4/1990 | Stallings ............................. 254/323 |

FOREIGN PATENT DOCUMENTS 845521 4/1939 France ................................ 254/323
361221 11/1931 United Kingdom ................ 464/174

OTHER PUBLICATIONS

1986/87 Sears Special Catalog, 4×4, Off-Road Pickup and Camping Equipment, p. 21.
1989 Chevy Trucks brochure, p. 40.

Primary Examiner—Katherine Matecki
Attorney, Agent, or Firm—Michael Yakimo, Jr.

[57] ABSTRACT

A holder for a vehicle spare tire which diminishes the possibility of tire theft from the vehicle. The holder includes a hoist attached to the vehicle frame. This hoist is driven by a key wrench which engages a key aperture associated with the hoist drive means. A flexible guide directs the key wrench from the exterior portion of the vehicle into its key aperture. The guide comprises a flexible spring which is associated in a slidable relationship with the hoist. The flexion and/or slidable connection of the guide precludes operation of the hoist by manipulation of the guide. The key wrench is user-driven by a drive tube/lug wrench combination. The flexion and/or slippage connection cooperates with the key wrench assembly so as to diminish the possibility of operation of the hoist and lowering of the spare tire to the ground by non-authorized users.

21 Claims, 2 Drawing Sheets

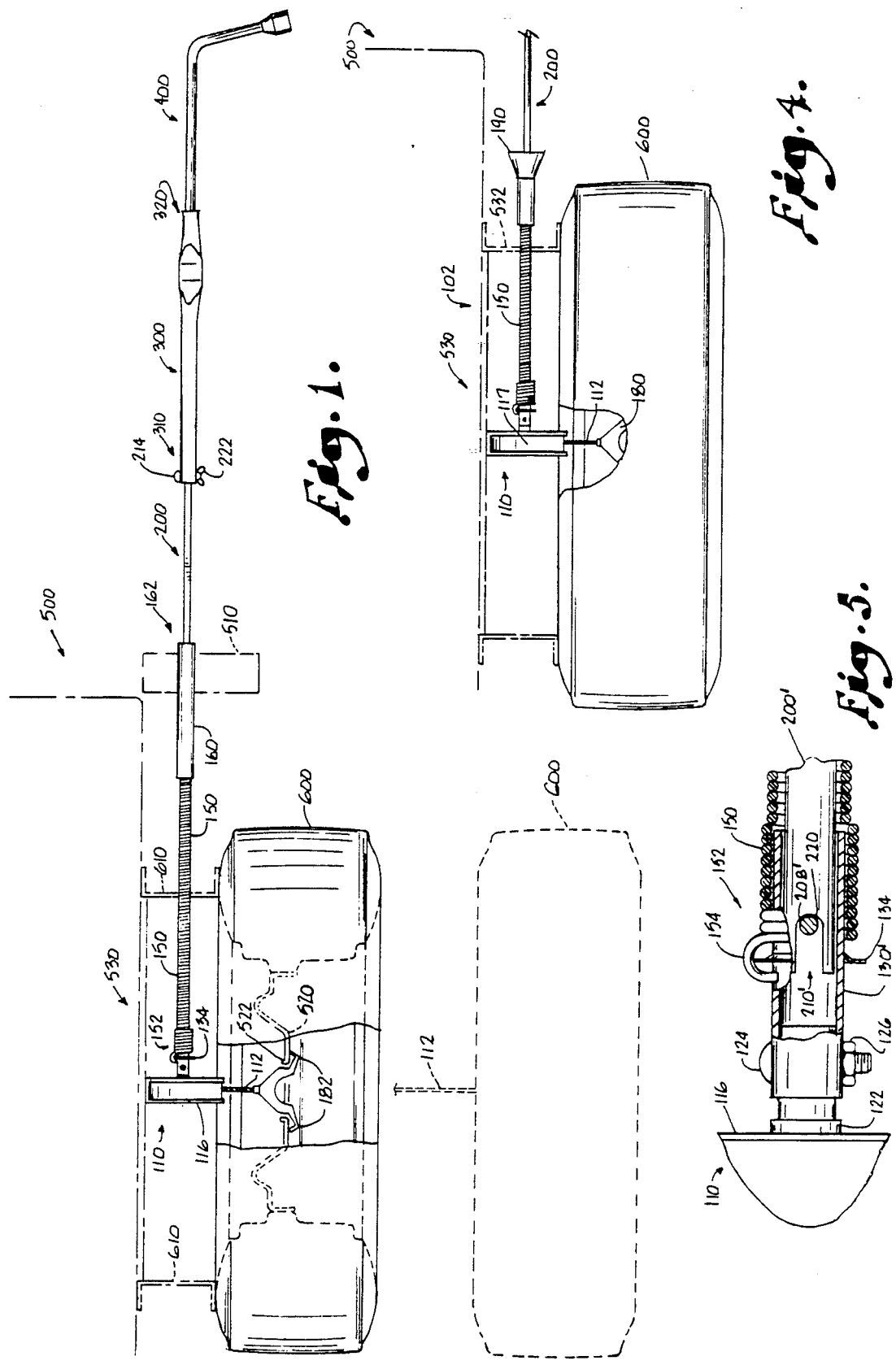

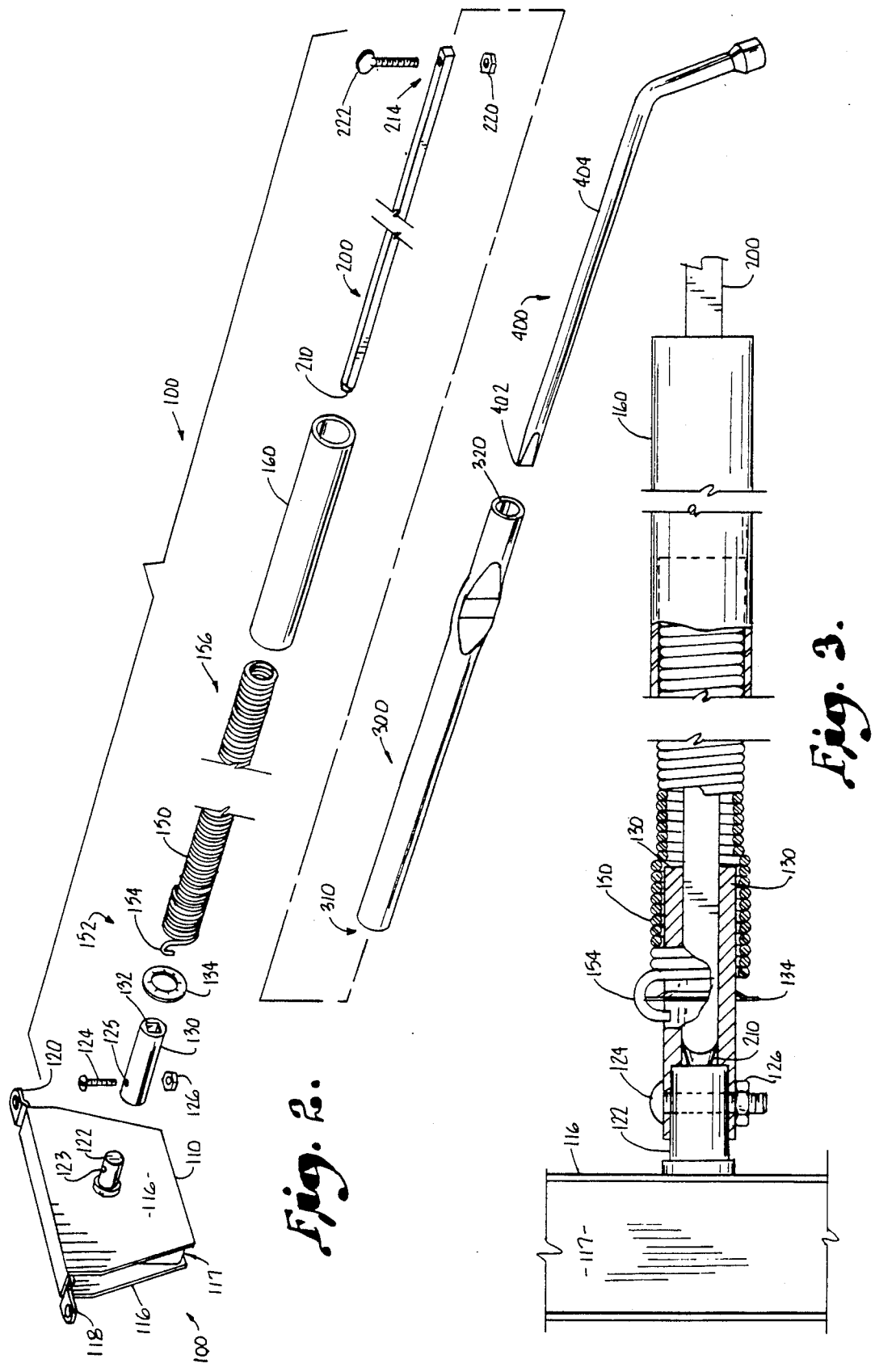

SPARE TIRE HOLDER AND WHEEL LOCK

BACKGROUND OF THE INVENTION

This invention pertains to a spare tire holder/locking system and more particularly to a device which precludes the theft of a spare tire from particular motor vehicles, e.g. a pickup truck or the like.

In some motor vehicles, e.g. pickup trucks, the spare tire is positioned in a transport position adjacent the underside of the vehicle frame by means of a hoist which is attached to the frame. A clamp is mounted at the free end of the hoist cable which is releasably secured to the vehicle wheel. A rigid, hollow drive shaft extends between the hoist and the exterior of the vehicle. This drive shaft is rotated upon insertion of the pointed end of a lug wrench into the drive shaft. This rotation lengthens the cable of the associated hoist pulley so that the tire is lowered to the ground. Alternatively the drive shaft is rotated by the user in an opposite direction so as to shorten the cable of the associated hoist pulley and raise the tire from the ground into a transport position adjacent the vehicle frame.

A problem has arisen with these prior tire holders. A thief can rotate the drive shaft by a wrench, pliers, screwdriver or by hand. Thus the tire can be lowered to the ground and carried off. One response has been to lock the tire to the vehicle frame by use of a chain/padlock combination. However the chain rattles during vehicle travel which is annoying to the vehicle occupants. Also the padlock is located underside the vehicle in a relatively inaccessible location to the user. The lock can become covered with dirt, road tar, grime etc. which precludes the easy disengagement of the lock from the security chain.

Furthermore, the rigid drive shaft can become dented or misaligned due to normal road travel. Also, as one end of the drive shaft is supported by the vehicle bumper or a body panel a minor accident can misalign the bumper or panel. This misalignment is transferred to the drive shaft which can render the drive shaft inoperable.

Also, in prior devices the proximal end of the drive shaft, which is presented to the user for insertion of the lug wrench therein, can become clogged with ice, dirt, etc. which can delimit user-access thereto. Also, this proximal end may be difficult to find in darkness or inclement weather.

In response thereto, I have invented a novel spare tire holder/wheel lock which secures the spare tire to the vehicle frame and precludes its unauthorized removal. My device generally comprises a hoist with cable which is releasably attached to the vehicle wheel. A flexible guide tube is connected to the hoist in a slidable connection therebetween and extends to the exterior of the vehicle. For spare tire removal a key wrench is extended through the guide tube. One keyed end of the wrench is operably connected to a drive socket on the hoist. The other end of the key wrench shaft is operably connected to a drive shaft which receives a standard lug wrench therein. User rotation of the lug wrench rotates the drive shaft and key wrench linked thereto. This rotation is transferred to the drive socket and associated hoist. Rotation of the lug wrench lengthens the cable to position the spare tire on the ground. Opposed rotation will shorten the cable and position the tire adjacent the frame in a transport position.

The flexion and/or rotation of the guide tube precludes a thief from obtaining purchase thereon. Thus, motion of the guide tube cannot operate the hoist and lower the tire to the ground. The segmented drive shaft, i.e. the key wrench/drive tube/lug wrench combination, precludes operation of the hoist with other mechanical devices. Accordingly the hoist cannot be operated and the spare tire removed from the vehicle unless the operator has the correct combination of elements to connect the same to the drive socket and operate the hoist. Thus security of the tire is enhanced.

Accordingly it is a general object of this invention to provide a spare tire holder and wheel lock for vehicles which diminishes the possibility of tire theft.

Another object of this invention is to provide a locking device, as aforesaid, which is adaptable for retrofit with preexisting spare tire holders.

Still another object of this invention is to provide a locking device, as aforesaid, which is easily installed without drilling or modifying the vehicle.

A further object of this invention is to provide a locking device, as aforesaid, which eliminates the need to use chains, locks or the like in order to secure the spare tire to the vehicle.

Another object of this invention is to provide a locking device, as aforesaid, which is easily operable in various weather and visibility conditions.

A further object of this invention is to provide a device, as aforesaid, which is operable only by a certain linkage assembly associated with the vehicle.

Another particular operation of this invention is to provide a device, as aforesaid, which utilizes flexible and/or slippage connections to delimit the unauthorized operation of the device.

Other objects and advantages will become apparent after a review of the following specification, claims and drawings.

BRIEF DESCRIPTION OF THE DRAWINGS

FIG. 1 is a side view of the device installed on a vehicle, as shown in phantom lines, with a portion of the spare tire in a transport position being broken away to illustrate the clamp/wheel interface.

FIG. 2 is an exploded view of the spare tire holder/wheel lock as removed from the vehicle.

FIG. 3 is an enlarged view of the hoist/drive means/guide tube interface with the key wrench inserted therein.

FIG. 4 is a side view of an alternative embodiment of the spare tire holder/wheel lock.

FIG. 5 is an enlarged view of the hoist/drive means/guide tube interface of the device illustrated in FIG. 4.

DESCRIPTION OF THE PREFERRED EMBODIMENT

Turning more particularly to the drawings, FIGS. 1–3 illustrate one preferred embodiment of my invention 100 in position on a bumper 510 equipped vehicle 500. A portion of the rear end of the vehicle 500 is illustrated in phantom lines. The spare tire 600 is illustrated in solid lines in a transport position adjacent the vehicle frame 610 and in phantom lines in a lowered position. FIGS. 4–5 illustrate an alternative embodiment in use on a bumperless vehicle 500'.

As more particularly illustrated in FIG. 2, the holder/locking device, generally designated as 100, comprises a hoist 110 with a cabled 112 pulley therein. The pulley is located in a housing 117 positioned between the sidewalls 116. The hoist assembly 110 is attached to the underside of the vehicle 500 by means of bolts (not shown) extending through the brackets 118, 120.

Extending from one sidewall 116 is a rotatable drive shaft 122 which is operably connected to the pulley located within housing 117. Rotation of drive shaft 122 rotates the pulley and concurrently lengthens or shortens the associated cable 112 according to the direction of rotation.

A drive collar 130 is connected to the shaft 122 by means of a bolt 124/nut 126 combination extending through aligned apertures 123, 125 in the collar 130 and shaft 122 nested therein. The collar 130 includes a keyed aperture 132 therein for receiving a complementary male end of a key wrench therein. Positioned about this collar 130 is a spring retainer ring 134. This ring 134 provides a clamping surface for the free hooked end 154 of a flexible spring guide 150.

The flexible spring guide 150 is illustrated in a foreshortened position for ease of illustration. This tube includes a distal end 152 having the free clamping hook 154 and a user-accessible proximal end 156. As shown in FIG. 3, a portion of the free end of the drive collar 130 extends into the guide tube 150 to allow the hook 154 to extend over the ring 134 in a slidable rotation therearound. Upon this hook 154/ring 134 interface, the guide 150 is rotatable about the drive collar 130 in slidable relationship therebetween.

This flexible guide 150 extends between the collar 130 and the rear vehicle 500 bumper 510 as shown in FIG. 1. The proximal end 156 of the guide 150 is positioned within a cylindrical support shaft 160 which extends through the vehicle bumper 510. This shaft 160 presents an aperture 162 for insertion of a male end 210 of an elongated key wrench 200 therein.

The key wrench 200 is an elongated shaft having a first male end 210 which has a configuration complementary to the configuration of the key aperture 132 of the drive collar 130. Thus, this male end 210 is received within the collar 130 so as to have a driving engagement therebetween. As such rotation of the wrench 200 rotates the drive collar 130 operably connected thereto.

Attached to the opposed proximal end 214 of the key wrench 200 is a rigid cylindrical drive tube 300 having distal 310 and proximal 320 ends. In a retrofit application this drive tube 300 is the original rigid drive tube which extended between the original hoist and bumper. This drive tube is removed from its normal extension between the bumper 510 and hoist 110 and is replaced by the flexible guide 150/support shaft 160 combination as above described. Of course, in an original application the drive tube is supplied to the vehicle owner. The distal end 310 of drive tube 300 is attached to the proximal end 214 of the key wrench 200 by a nut/bolt combination 220, 222. The proximal end 320 of the drive tube 300 is configured so as to receive the male end 402 of the standard lug wrench 400 of the vehicle 500 in a driving connection therebetween. Accordingly user rotation of wrench 400 rotates drive tube 300 and key wrench 200. This rotation rotates the drive collar 130, shaft 122 and pulley 114 linked thereto.

Prior to use the spare tire 600 is in its FIG. 1 transport position adjacent the vehicle frame. The key wrench 200 is attached to the drive tube 300 as above described. The distal end 210 of the wrench 200 is inserted through the support shaft 160 through the guide tube 150 and into the drive collar 130 aperture 132. The male end 402 of the lug wrench 400 is then inserted into the crimped drive tube 300. User rotation of the lug wrench 400 is transferred to the key wrench 200 via the drive tube 300 linkage. This rotation rotates the drive collar 130 and associated pulley shaft 132 so as to lengthen the cable 112 and lower the spare tire 600 to the ground.

A winged clamp 180 is attached to the end of the cable 112. For attachment to the wheel, the wings 182 of clamp 180 are canted so as to extend through the hub aperture 522 of wheel 520. These wings 182 are then returned to a horizontal position to allow the wings 182 to interface with the wheel 520 as shown in FIG. 1. Upon removal of the clamp 180 the spare 600 is available for use. The replaced tire is then attached to the end of the cable 112 by means of the clamp 180 as above described. Counter rotation of the lug wrench 400 ultimately rotates the pulley in an opposed direction which shortens the cable 112 so as to raise the tire 600 to the FIG. 1 transport position.

An alternative embodiment 102 of the locking device for use with bumperless vehicles is shown in FIGS. 4-5. As such the flexible guide 150 extends through a member 532 or exterior body portion of the vehicle frame 530. A funnel 190 is attached to the end of the guide tube 150 and enhances the guidance of the slotted 208' male end 210' of the key wrench 200' into the guide 150. The male end 210' of the key wrench 200 then interfaces with a pin 220 which extends across the complementary aperture 132 of drive collar 130. It is thus noted that the male end 210 and collar aperture 132 may be of various complementary configurations which would preclude the use of other non-complementary wrenches 200 from operating the hoist 110. The linkage 300, 400 is used in a manner identical to the first described embodiment 100.

As such it can be appreciated that my above disclosed devices offer distinct functional and security advantages. The flexion of the guide tube 150 precludes the transfer of the guide tube 150 rotation to the drive collar 132 so as to operate the hoist 110 and lower the spare tire 600. The use of a further slippage connection, i.e. the slidable interface between the guide 150 and ring 134, further precludes a transfer of rotation from the guide 150 to the pulley shaft 122. Finally, the segmented drive assembly, i.e. the keyed collar 130/key wrench 200/drive tube 300/lug wrench 400 combination reduces the possibility of effective hoist operation by others who lack the proper linkage assembly. As such, the security of the spare tire 600 is enhanced. Furthermore the above structures are not susceptible to damage from road elements, accidents, weather elements and the like as found in previous devices. Finally, the use of the funnel 190 as disclosed in the alternative embodiment 102, so as to guide the wrench 200' therein, enables the devices to be easily operated in darkness and/or in other reduced visibility conditions.

Although various embodiments of this invention have been shown, it is understood that my invention is to be not limited thereto except as set forth in the claims and equivalents thereof.

Having thus described the invention, what is claimed as new and desired to be secured by Letters Patent is:

1. A holder for a spare tire of a vehicle comprising:
hoist means for raising and lowering said spare tire between raised and lowered positions;
means for mounting said hoist means to said vehicle;
clamp means connected to said hoist means and including structure for releasably connecting said spare tire with said hoist means;
drive means for operating said hoist means;

a drive shaft having a first end comprising means for releasably connecting said drive shaft to said drive means and a second end adjacent an exterior portion of said vehicle;

guide means extending between said drive means and said exterior portion of said vehicle for directing said first end of said drive shaft into connection with said drive means; and means for connecting said guide means to said drive means in a slidable relationship therebetween, said means precluding a purchase of said drive means and operation thereof by said guide means, whereupon operation of said drive shaft operates said drive means and hoist means in a manner to position said clamped tire between a lowered user accessible position and a raised transport position.

2. The apparatus as claimed in claim 1, whereupon said hoist means comprises:
a pulley;
a cable having a first end connected to said pulley and a second end connected to said clamp means; and
said operation of said drive means rotating said pulley, said pulley rotation winding or unwinding said cable from said pulley corresponding to a direction of said rotation, whereby to position said clamped tire between said user accessible and transport positions.

3. The apparatus as claimed in claim 2, whereupon said drive means comprises:
a shaft extending from said pulley; and
means for coupling said shaft of said pulley to said first end of said drive shaft.

4. The apparatus as claimed in claim 3, wherein said coupling means comprises:
a drive collar for receiving a portion of said pulley shaft therein;
means for fastening said collar to said pulley shaft; and
means in said drive collar for receiving said releasable connecting means at said first end of said drive shaft.

5. The apparatus as claimed in claim 4, wherein said means in said drive collar comprises an aperture for receiving said releasable connecting means at said drive shaft first end therein, said aperture being configured to transmit a rotation between said drive shaft and said drive collar.

6. The apparatus as claimed in claim 1, wherein said guide means comprises:
a flexible conduit having a distal end and a proximal end at said exterior portion of said vehicle, said flexible conduit hindering a purchase of said conduit to preclude operation of said drive means by manipulation of said guide means.

7. The apparatus as claimed in claim 6, wherein said guide means connecting means comprises:
a retainer ring about said drive means; and
means at said distal end of said flexible conduit for clamping said conduit to said ring in slidable rotation therebetween, whereupon said conduit is rotatable about said drive means.

8. The apparatus as claimed in claim 7, further comprising:
a cylindrical shaft including a through bore presenting an exterior aperture and extending through said exterior portion of said vehicle, said proximal end of said conduit extending into said bore of said shaft, wherein said releasable drive shaft extends through said cylindrical shaft and said conduit therein.

9. The apparatus as claimed in claim 7, wherein said flexible conduit comprises a spring.

10. The apparatus as claimed in claim 9, wherein said clamping means on said spring comprises a hook at the distal end of said spring.

11. The apparatus as claimed in claim 6, further comprising:
means on said proximal end of said conduit for directing said releasable drive shaft into said guide means.

12. The apparatus as claimed in claim 11, wherein said directing means comprises a funnel at said proximal end of said conduit.

13. The apparatus as claimed in claim 1 wherein said drive shaft comprises:
an elongated shaft having said first end and said second end;
a drive tube adapted to receive an end of a lug wrench in a driving connection therebetween; and
means for connecting said drive tube to said second end of said shaft whereupon rotation of said lug wrench rotates said drive tube and said shaft to provide said operation of said drive means.

14. A holder for a spare tire of a vehicle for hindering the theft of said spare tire from a vehicle comprising:
hoist means for raising and lowering said spare tire between raised and lowered positions;
means for mounting said hoist means to said vehicle;
clamp means connected to said hoist means and including structure for releasably connecting said spare tire with said hoist means;
drive means for operating said hoist means;
a drive shaft having a first end comprising means for releasably connecting said drive shaft to said drive means and a second end adjacent an exterior portion of said vehicle;
flexible guide means extending between said drive means and said exterior portion of said vehicle for directing said first end of said drive shaft into connection with said drive means, said flexibility of said guide means hindering operation of said drive means by manipulation of said guide means, whereupon operation of said drive shaft operates said hoist means in a manner to position said clamped tire between said raised and lowered positions.

15. The apparatus as claimed in claim 14, wherein said flexible guide means comprises:
a conduit having distal and proximal ends;
means for connecting a distal end of said conduit to said drive means in a slidable relationship therebetween; and
means for positioning said proximal end of said conduit at said exterior portion of said vehicle for initial insertion of said releasable drive shaft therein, said slidable relationship cooperating with said flexible conduit to hinder operation of said drive means by said guide means.

16. The apparatus as claimed in claim 15, wherein said conduit comprises a flexible spring extending between said drive means and said exterior portion of said vehicle.

17. The apparatus as claimed in claim 16, wherein said hoist means comprises a cabled pulley with a free end of said cable releasably attached to said spare tire, said drive means comprises:
a shaft extending from said pulley; and means for coupling said shaft of said pulley to said releasable drive shaft.

18. The apparatus as claimed in claim 17, wherein said coupling means comprises:
    a collar for receiving a portion of said pulley shaft therein;
    means for connecting said collar to said shaft; and
    means in said collar for receiving said releasable connecting means at said first end of said drive shaft in said releasable connection therebetween.

19. The apparatus as claimed in claim 18, wherein said slidable connecting means comprises:
    a retainer ring about said collar; and
    means at a distal end of said spring for slidably connecting said spring end to said ring, whereupon said spring is rotatable about said drive collar to preclude a transfer of rotation of motion therebetween and operation of said drive means.

20. In a spare tire holder for a vehicle including hoist means for raising and lowering said spare tire between user accessible and transport positions, the improvement comprising:
    guide means extending between said hoist means and an exterior portion of said vehicle;
    means for associating said guide means with said hoist means in a slidable relationship therebetween, said means precluding operation of said hoist means by manipulation of said guide means;
    a releasable drive shaft for extension between said hoist means and an exterior portion of said vehicle, said guide means directing said drive shaft into a driving connection with said hoist means for operation of said hoist means.

21. In a spare tire holder for a vehicle including hoist means for raising and lowering said spare tire between user accessible and transport positions, the improvement comprising:
    a releasable drive shaft for extension between said hoist means and an exterior portion of said vehicle; and
    flexible guide means extending between said hoist means and said exterior portion of said vehicle for directing said drive shaft into a driving connection with said hoist means for operation of said hoist means, said flexibility of said flexible guide means precluding operation of said hoist means by manipulation of said guide means.

* * * * *